United States Patent Office 3,491,187
Patented Jan. 20, 1970

3,491,187
IRON SALT-ANTIBIOTIC COMPOSITIONS AND USE THEREOF
Charles M. Ely, Berkeley Heights, N.J., assignor to Diamond Shamrock Corporation, a corporation of Delaware
No Drawing. Filed Feb. 27, 1967, Ser. No. 619,022
Int. Cl. A61k 25/02, 21/00, 15/00
U.S. Cl. 424—181                                14 Claims

ABSTRACT OF THE DISCLOSURE

Compositions, which are mixtures of particular iron salts and particular antibiotics, are dissolved in water to form stable, compatible aqueous compositions useful as drinking waters for animals, particularly, young unweaned pigs. A typical example is a mixture of ferric ammonium citrate and neomycin sulfate in a 4:1 weight ratio plus vitamins and diluents dissolved in water.

BRIEF SUMMARY OF THE INVENTION

This invention relates to stable compatible water soluble compositions which form stable, compatible aqueous compositions and more particularly to iron salt-antibiotic compositions which are capable of forming stable, compatible aqueous compositions useful as drinking water for animals to protect such animals from nutritional deficiencies as well as infectious diseases and other disorders arising from nutritional deficiencies.

It is well known that domestic animals often suffer from nutritional deficiencies as well as infectious diseases and other disorders arising from nutritional deficiencies, and that such disorders result in serious economic losses to livestock producers. For example, a relatively large portion of young domestic animals are lost prior to weaning and immediately after weaning because of poor nutrition and disorders caused by poor nutrition. Young livestock such as pigs, calves, lambs, kids, colts and the like depend on their mother's milk as the principal source of nourishment up to eight weeks after birth. It has been long recognized that nutritional anemia, infectious diseases and other secondary causes, attributable to nutrition anemia account for a high portion of the losses of young pigs prior to weaning. Sow's milk contains little if any of the essential minerals such as iron, and young pigs frequently suffer from nutritional anemia. Furthermore, breast fed pigs are very susceptible to infections such as scours. The mortality rate for young pigs has been estimated to be as high as 35%. Various methods have been proposed to reduce the mortality rate of young animals such as young pigs. Generally, such methods have been directed toward supplying external sources of essential minerals particularly iron and antibiotics to correct nutritional deficiencies in the mother's milk, and to provide further protection to the young animals during the critical period prior to weaning. It has been found that young pigs are not as healthy and do not gain weight as rapidly if their nutritional deficiencies are not corrected and their infectious diseases are not curbed during the first week after farrowing and preferably within the first or second day after farrowing.

The most common method of treating young animals for nutritional deficiencies is to administer preparations containing minerals and antibiotics to the young animals within one or two days after farrowing. The preparations are usually administered orally or parenterally. Each young animal must be treated individually. Treatment involves giving each animal several doses in the form of capsules, drenches or injections. As a practical matter, individual treatment has not given satisfactory results. Each animal must be treated several times and must be segregated from those which have not been treated the same number of times. Segregation is particularly difficult when the livestock producer has many litters whose ages range over a relatively broad period of time. Further, there is the possibility that some of the animals might not receive the required number of doses.

In accordance with current practices, essential minerals are administered as a separate treatment in the form of capsules, drenches or other types of medication. Usually the minerals are in the form of their salts. Useful salts include the nontoxic salts of iron as well as nontoxic salts of other metals such as copper salts, zinc salts, cobalt salts, maganese salts and the like. Nontoxic iron salts are particularly useful in controlling nutritional anemia. Useful iron salts include ferrous sulfate, ferrous fumarate, ferrous lactate, ferrous calcium citrate, ferrous gluconate, soluble ferric pyrophosphate, insoluble ferric pyrophosphate, ferric ammonium citrate, iron tartrate and complex iron salts such as ferrous choline citrate or ferrous glycinate. Since iron salts have little if any compatibility with the other therapeutic agents employed in the treatment of nutritional deficiencies and infectious diseases, they are usually given in the form of a separate treatment. The preferred method of treatment is to give each young animal one or more parenteral injections of a solution of a soluble iron salt. As pointed out above, this type of treatment requires segregation of treated and untreated animals and is quite inefficient, time consuming, expensive and generally unsatisfactory. Furthermore, this method has the added disadvantage that the animals must be given separate treatments of other therapeutic agents such as antibiotics and the like with the result that each animal receives several individual treatments with two or more different medicaments. Such a regimen is unsatisfactory in that it requires handling each animal several times which is not conductive to the well being of the animal, particularly, a young or sickly animal.

In U.S. Patent 3,259,500—Barnhart et al., July 5, 1966, it was proposed that the disadvantages of individual iron salt treatment of young animals be avoided by feeding the sow massive dosages of certain iron salts. This method has the disadvantage that feedstuffs containing iron salts must be fed to the sow for more than two weeks prior to farrowing as well as during the lactating period. It has the added disadvantage that the iron salts must be transmitted from the mother to the young via the mother's milk. Further, there is the possibility that sickly or weak young pigs may not receive the required amounts of iron salts. Furthermore, the use of massive dosages of iron salts in the feed may make the feed unpalatable to the sow. Likewise, this treatment is not effective when the sow does not have the desire to consume the feed or refuses to eat.

Numerous attempts have been made to formulate iron salts with other therapeutic agents so that a young animal can be given a single composition as a medicament. Such compositions are described in U.S. Patent 2,703,285—Luther, Mar. 1, 1955, U.S. Patent 2,926,084—Geerlings, Feb. 23, 1960 and U.S. Patent 2,926,085—Geerlings, Feb. 23, 1960. Since iron salts have little if any compatibility with the other therapeutic agents commonly employed, satisfactory liquid compositions have been difficult to prepare and use. Consequently, the most satisfactory iron salts-antibiotic compositions to date have been solid compositions, particularly, those which can be added to feedstuffs. Although solid compositions incorporated in feedstuffs may be suitable for the treatment of healthy adult animals, they are not suitable for the treatment of young animals before they are weaned or for sickly animals. Since unweaned or sickly animals are in the greatest need of treatment and are usually unable to digest solid feedstuffs, use of solid compositions in feedstuffs has not been satisfactory for the treatment of either unweaned or sickly animals. Further, in administering solid food to newborn, unweaned pigs, there is usually little or no intake of solid food until the animals reach an age of about 7 to about 10 days. Even after this period, intake of solid food by unweaned pigs is erratic and unpredictable. Consequently, most livestock producers have come to rely on parenteral injection of iron salts accompanied by supplemental treatment with other therapeutic agents such as antibiotics.

It is the object of the present invention to provide stable, compatible water soluble compositions of iron salts and antibiotics which form stable, compatible aqueous water soluble compositions useful as drinking waters for animals as well as the resulting aqueous compositions. A further object is to provide a process employing such aqueous compositions as drinking waters for animals to protect the animals from nutritional deficiencies, infectious diseases resulting from such deficiencies and the like. Other objects will become apparent from the detailed description given hereinafter. It is intended, however, that the detailed description and specific examples do not limit the present invention but merely indicate preferred embodiments thereof since various changes and modifications within the scope of the present invention will become apparent to those skilled in the art.

The above as well as other objects of the present invention have been unexpectedly achieved in the following manner. I have discovered that stable, compatible water soluble compositions of particular water soluble iron salts and particular water soluble antibiotics can be prepared and utilized to produce stable, compatible aqueous water soluble compositions useful for drinking waters for animals, particularly young unweaned pigs, to protect these animals consuming such drinking waters from nutritional deficiencies and infectious diseases resulting from nutritional deficiencies and the like. Such compositions are in the form of finely divided solids such as powders, crystals or the like, which readily dissolve in water to produce aqueous compositions. These compositions contain weight ratios of iron salt to antibiotic of from about 1:5 to about 20:1. Solutions produced from these compositions remain free from oxidative deterioration, do not precipitate or react on standing and in rare cases at most only show traces of sediment formation. They are prepared using weight ratios of from about 1:80 to 1:2000 wherein such ratios are the ratios of the weight of the iron salt-antibiotic composition to the weight of water employed. Such compositions produce stable, compatible aqueous compositions useful as ad libitum drinking waters for animals when the weight of ratio of iron salt-antibiotic to water used is from about 1:80 to about 1:2000.

I have found that such compositions can be prepared from a water soluble iron salt, viz, ferric ammonium citrate, and a water soluble antibiotic, viz, neomycin sulfate, streptomycin sulfate, potassium pencillin or tylosin tartrate or their mixtures. Compositions can also be prepared from a water soluble iron salt, viz, ferric pyrophosphate and a water soluble antibiotic, viz, potassium pencillin or tylosin tartrate or their mixtures. When desired, additives such as water soluble vitamins, e.g., niacin, calcium pantothenate, thiamine mononitrate or the like; fat soluble vitamins, e.g., vitamins A, D, $D_3$, E or the like in a soluble matrix such as gelatin, dextrin or water soluble starch; water soluble trace minerals, e.g., copper sulfate, water soluble forms of manganese sulfate and the like and water soluble diluents, e.g., sucrose, dextrose, other sugars, soluble starches (dextrins) or the like can be incorporated in the compositions provided they do not adversely affect the properties, e.g., stability and the like, of the solutions produced from the compositions. One or more of those additives can be used as desired.

Further, such compositions are readily soluble in water without need for stabilizing agents, solubilizing agents, or combinations thereof. These compositions do not contain such stabilizing agents, solubilizing agents or combinations thereof. Further, when additives are used in the compositions, such additives are chosen so that they do not function as stabilizing agents, solubilizing agents or the like for the iron salts and/or antibiotics. Thus, these compositions are unique in that they form stable, compatible aqueous water soluble solutions without need for the aforesaid stabilizing agents, solubilizing agents, etc., whereas other common iron salt-antibiotic compositions are not water soluble, oxidize in solution, precipitate from solution or are otherwise unsuitable for use in drinking waters for animals.

The aqueous water soluble compositions are solutions which are useful as drinking waters for drinking ad libitum by animals when prepared from the compositions disclosed in this invention and utilized in accordance with this invention. These aqueous solutions have such outstanding stabilities that the active ingredients present do not react, decompose, oxidize, precipitate or separate from solution even after the solutions have stood for extended periods of time. The remarkable stabilities of solutions prepared from these compositions make the compositions particularly useful in the preparation of ad libitum drinking waters for animals. Drinking waters prepared in accordance with this invention remain stable and unchanged for extended periods of time. Furthermore, I have found that when these compositions are prepared and used in the preparation of drinking waters, particularly for young animals, that the young animals, especially unweaned animals, consume sufficient quantities of the dissolved compositions to obtain the required levels of iron salts and antibiotics to protect the animals from nutritional deficiencies, infectious diseases resulting from nutritional deficiencies and the like. It was unexpected that young animals would consume sufficient quantities of drinking waters containing these compositions to protect them in view of the difficulties which have been experienced in the past when attempts were made to feed young animals solid preparations or liquids such as dispersions containing iron salts and antibiotics. The present invention has the further advantage over the prior art in that supplemental treatments such as injections of iron salts, antibiotics or the like are not required.

Drinking waters prepared from these compositions have outstanding properties such as compatibility, color and stability and are suitable for use in automatic drinking water systems for animals. Such drinking waters show at most a slight trace of sediment after standing for extended periods of time and do not lose their efficacy. The appearance of traces of sediment in the drinking waters prepared in accordance with the present invention is attributable to the presence of small amounts of insoluble impurities in the active ingredients used in the compositions. When desired, additional drinking water can be prepared in accordance with this invention and added to the being used as drinking water without danger of reaction, precipitation, oxidation, separation or other compatibility problems. Such drinking waters can be supplied ad libitum to the animals in waterers or other conventional equipment normally used for supplying drinking waters to animals.

The stable, compatible water soluble compositions described above can be prepared by mixing the required quantities of iron salts and antibiotics in the form of finely divided solids at room temperature until a uniform mixture is obtained. The weight ratio of iron salt to antibiotic used in compositions is in the range of from about 1:5 to about 20:1. When desired, one or more of the additives described above can be incorporated in the composition. Since the compositions are readily soluble in water, it is not necessary to use surfactants such as stabilizing agents, solubilizing agents or the like.

Stable, compatible aqueous compositions useful as ad libitum drinking waters for animals can be prepared by mixing about one part by weight of the above composition with from about 80 parts by weight to about 2000 parts by weight of water. Since the solid compositions are readily soluble at these concentrations, the solutions can be prepared with a minimum of agitation. The solutions can be prepared by simply shaking the composition with the required amount of water or by simple mechanical mixing, e.g., by use of a paddle or a light duty mechanical stirrer. After preparation, the appearance of the solution is determined by visual observation at 0 and 72 hours after preparation. The solution is examined for color change, precipitation and other changes which indicate incompatibility or reaction of the iron salts and/or antibiotics. If the solution discolors on standing, i.e., it darkens, this indicates that oxidation of the active ingredients may have occurred. If a precipitate forms in the solution after preparation, this may also be an indication of oxidation, i.e., one or more of the active ingredients has oxidized to form an insoluble precipitate. If the solution contains a precipitate immediately after preparation, this indicates that the active ingredients are incompatible, i.e., they have reacted to form an insoluble precipitate. For a solution to be satisfactory as a drinking water for animals, it should show little if any color change initially after preparation and after standing for 72 hours at room temperature. Further, the appearance of solution should remain unchanged and the solution should not contain any form of precipitate other than a slight trace of sediment. Such a sediment is the result of traces of insoluble impurities present in the ingredients used in the formation of the composition, and is not the result of oxidation and/or reaction of the active ingredients.

For a fuller understanding of the nature and objects of this invention, reference may be made to the following examples which are given merely to illustrate the present invention and are not to be construed in a limiting sense. All weights and weight ratios given in the examples are based on the weight of the ingredients used. Unless otherwise indicated, all preparations and observations were made at room temperature, e.g., about 25° C. In the examples, the term "mixture" or "composition" refers to the mixture of iron salts and antibiotics in the form of finely divided solids and the term "solution" refers to the aqueous composition obtained when the mixture is dissolved in water.

EXAMPLE I

The compositions shown in the table entitled Example I were prepared and evaluated in the following manner. These compositions were prepared by mixing at room temperature. The indicated quantities of ferric pyrophosphate and chlorotetracycline hydrochloride in the form of finely divided solids were mixed at room temperature to obtain uniform compositions having weight ratios of iron salts to antibiotics of 1:5, 5:1 and 20:1. The weight ratios used in the compositions were based on the weights of the active ingredients, that is, the iron salt and the antibiotic. Aqueous solutions of each of the compositions shown in the table were prepared by mixing the composition with water at the indicated weight ratios of composition to water, that is, 1:80, 1:400, 1:1000 and 1:2000. Each solution was prepared by mixing the composition with water at room temperature by means of a simple mechanical stirrer. The appearance of the solution was determined by visual observation at 0 and 72 hours after preparation. The solution was examined for color, precipitation and any other change which might indicate incompatibility or reaction of the iron salts and/or antibiotics. The appearance of each solution is recorded in the table. It is to be noted that none of the solutions prepared with the compositions was a stable, compatible aqueous composition which was satisfactory for use as an animal drinking water. All of the solutions were dark in color and many contained a precipitate. Further, the solutions oxidized during standing for 72 hours at room temperature, that is, they became darker in color and the iron salt and/or antibiotic reacted to produce a precipitate or additional precipitate.

EXAMPLES II THROUGH XVIII (INCLUSIVE)

The compositions shown in the tables entitled Example II through Example XVIII were prepared and evaluated in the manner described in Example I above. Appearance of solutions containing various weight ratios of the compositions to water is shown in the tables.

The compositions of Examples II, III, IV, V, VI, VII, IX, XI, XII and XIV, like Example I, were unsatisfactory for use in the preparation of stable, compatible aqueous compositions useful as animal drinking waters. These compositions were unsatisfactory because they produced highly colored solutions or solutions that precipitated, oxidized or underwent other changes which indicated incompatibility or reaction of the iron salts and/or antibiotics.

The compositions of Examples VIII, X, XIII, XV, XVI, XVII and XVIII were satisfactory for use in the preparation of stable, compatible aqueous compositions useful as animal drinking waters. These compositions produced solutions which showed little if any color change initially after preparation or after standing for 72 hours at room temperature. Further, the solutions remained unchanged and did not contain any form of precipitate other than a trace of sediment after standing for 72 hours at room temperature. The slight trace of sediment was the result of the presence of small amounts of insoluble impurities in the iron salts and/or antibiotics used in the formulations and was not the result of reaction of the iron salt and/or antibiotic. In Example XVIII, several of the solutions became hazy during standing for 72 hours at room temperature. The haze was the result of impurities in the composition and not the result of reaction of the iron salt and/or antibiotic. Further, the solutions did not show any evidence of oxidation or other forms of deterioration after standing for 72 hours at room temperature.

EXAMPLE I.—FERRIC PYROPHOSPHATE-CHLOROTETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water ||||
|---|---|---|---|---|---|
| | | Weight ratio of mixture to water ||||
| | | 1:80 | 1:400 | 1:1,000 | 1:2,000 |
| 1:5 | 0 | Dark brown black, very opaque solution; heavy precipitate; incompatible. | Black opaque solution; heavy precipitate; incompatible. | Black amber opaque solution; light precipitate. | Light black amber, slightly opaque solution; light precipitate. |
| | 72 | Dark brown black, very opaque solution; very heavy precipitate; oxidation. | Dark brown black opaque solution; very heavy precipitate; oxidation. | Dark black amber opaque solution; heavy precipitate; oxidation. | Black amber opaque solution; medium heavy precipitate; oxidation. |
| 5:1 | 0 | Black opaque solution; light precipitate. | Black amber opaque solution; light precipitate. | Light black amber hazy solution; slight precipitate. | Light black amber, slightly hazy solution; no precipitate. |
| | 72 | Very black opaque solution; heavy precipitate; oxidation. | Very black opaque solution; heavy precipitate; oxidation. | Black opaque solution; medium heavy precipitate; oxidation. | Light gray black opaque solution; light precipitate; oxidation. |

EXAMPLE I—Continued

| Weight ratio of iron salt to antibiotic in the mixture | Hours after preparation of solution | Appearance of solutions containing the indicated weight ratio of the mixture to water ||||
|---|---|---|---|---|---|
| | | Weight ratio of mixture to water ||||
| | | 1:80 | 1:400 | 1:1,000 | 1:2,000 |
| 20:1 | 0 | Very black, very opaque solution; heavy precipitate; incompatible. | Very black opaque solution; slight precipitate. | Black amber, slightly opaque solution; trace of precipitate. | Light gray amber, slightly hazy solution; no precipitate. |
| | 72 | Very black, very opaque solution; very heavy precipitate; oxidation. | Very black, very opaque solution; heavy precipitate; oxidation. | Black opaque solution; medium heavy precipitate; oxidation. | Light gray black opaque solution; light precipitate; oxidation. |

EXAMPLE II.—FERRIC AMMONIUM CITRATE-CHLOROTETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water ||||
|---|---|---|---|---|---|
| | | Weight ratio of mixture to water ||||
| | | 1:80 | 1:400 | 1:1,000 | 1:2,000 |
| 1:5 | 0 | Green black opaque solution; very heavy precipitate; incompatible. | Light green black opaque solution; heavy precipitate; incompatible. | Medium green yellow, slightly opaque solution; medium heavy precipitate. | Light green yellow hazy solution; light precipitate. |
| | 72 | Very black opaque solution; very heavy precipitate; oxidation. | Black opaque solution; very heavy precipitate; oxidation. | Dark green yellow opaque solution; heavy precipitate; oxidation. | Gray black, slightly opaque solution; medium heavy precipitate; oxidation. |
| 5:1 | 0 | Green black opaque solution; heavy precipitate; incompatible. | Light green black opaque solution; light precipitate. | Medium green yellow, slightly hazy solution; very light precipitate. | Light green yellow clear solution; no precipitate. |
| | 72 | Very black, very opaque solution; very heavy precipitate; oxidation. | Dark green black opaque solution; heavy precipitate; oxidation. | Green black opaque solution; medium heavy precipitate; oxidation. | Gray green, very slightly hazy solution; light precipitate; oxidation. |
| 20:1 | 0 | Dark green black, slightly opaque solution; heavy precipitate; incompatible. | Green black opaque solution; light precipitate. | Medium green yellow, slightly hazy solution; very light precipitate. | Light green yellow clear solution; no precipitate. |
| | 72 | Very black, very opaque solution; very heavy precipitate; oxidation. | Very black opaque solution; heavy precipitate; oxidation. | Black, slightly hazy solution; medium heavy precipitate; oxidation. | Gray black, very slightly hazy solution; light precipitate; oxidation. |

EXAMPLE III.—FERRIC PYROPHOSPHATE-TETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water ||||
|---|---|---|---|---|---|
| | | Weight ratio of mixture to water ||||
| | | 1:80 | 1:400 | 1:1,000 | 1:2,000 |
| 1:5 | 0 | Dark amber opaque solution; light precipitate. | Red amber opaque solution; slight precipitate. | Light red amber clear solution; very light precipitate. | Light red amber clear solution; no precipitate. |
| | 72 | Black amber, very opaque solution; heavy precipitate; oxidation. | Black amber opaque solution; medium heavy precipitate; oxidation. | Black amber, slightly hazy solution; light precipitate; oxidation. | Gray amber, slightly hazy solution; slight precipitate; oxidation. |
| 5:1 | 0 | Very black, very opaque solution; medium heavy precipitate. | Very black opaque solution; light precipitate. | Dark red amber clear solution; no precipitate. | Red amber clear solution; no precipitate. |
| | 72 | Very black, very opaque solution; heavy precipitate; oxidation. | Very black, very opaque solution; medium heavy precipitate; oxidation. | Black amber, slightly hazy solution; light precipitate; oxidation. | Dark amber, very slightly hazy solution; very light precipitate; oxidation. |
| 20:1 | 0 | Very black, very opaque solution; medium heavy precipitate. | Very black opaque solution; light precipitate. | Red amber, slightly hazy solution; no precipitate. | Light red amber clear solution; no precipitate. |
| | 72 | Very black, very opaque solution; heavy precipitate; oxidation. | Very black, very opaque solution; medium heavy precipitate; oxidation. | Black amber, slightly opaque solution; light precipitate; oxidation. | Light black amber clear solution; very light precipitate; oxidation. |

EXAMPLE IV.—FERRIC AMMONIUM CITRATE-TETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water ||||
|---|---|---|---|---|---|
| | | Weight ratio of mixture to water ||||
| | | 1:80 | 1:400 | 1:1,000 | 1:2,000 |
| 1:5 | 0 | Dark brown opaque solution; heavy precipitate; incompatible. | Brown yellow opaque solution; heavy precipitate; incompatible. | Red yellow, slightly opaque solution; heavy precipitate; incompatible. | Brown, very opaque solution; heavy precipitate; incompatible. |
| | 72 | Brown black, very opaque solution; very heavy precipitate; oxidation. | Light brown black opaque solution; very heavy precipitate; oxidation. | Red yellow opaque solution; heavy precipitate; no oxidation. | Brown, very opaque solution; heavy precipitate; no oxidation. |
| 5:1 | 0 | Brown yellow opaque solution; suspended solids. | Light brown yellow, slightly hazy solution; slight precipitate. | Yellow amber clear solution; no precipitate. | Dark yellow clear solution; no precipitate. |
| | 72 | Brown black, very opaque solution; very heavy precipitate; oxidation. | Brown black opaque solution; medium heavy precipitate; oxidation. | Light brown black opaque solution; light precipitate; oxidation. | Light brown black opaque solution; light precipitate; oxidation. |
| 20:1 | 0 | Brown amber opaque solution; suspended solids. | Brown yellow, slightly hazy solution; slight precipitate. | Dark brown yellow clear solution; no precipitate. | Medium yellow clear solution; no precipitate. |
| | 72 | Dark brown black opaque solution; heavy precipitate; oxidation. | Brown black, slightly opaque solution; slight precipitate; oxidation. | Green black clear solution; no precipitate; oxidation. | Light green black clear solution; no precipitate; oxidation. |

EXAMPLE V.—FERRIC PYROPHOSPHATE-OXYTETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Red amber opaque solution; light precipitate. | Red amber opaque solution; slight precipitate. | Light red amber clear solution; very light precipitate. | Light red amber clear solution; no precipitate. |
| | 72 | Black amber, very opaque solution; heavy precipitate; oxidation. | Black amber opaque solution; medium heavy precipitate; oxidation. | Black amber, slightly hazy solution; light precipitate; oxidation. | Gray amber, slightly hazy solution; slight precipitate; oxidation. |
| 5:1 | 0 | Very black, very opaque solution; medium heavy precipitate. | Very black opaque solution; light precipitate. | Dark red amber clear solution; no precipitate. | Red amber clear solution; no precipitate. |
| | 72 | Very black, very opaque solution; heavy precipitate; oxidation. | Very black, very opaque solution; medium heavy precipitate; oxidation. | Black amber, slightly hazy solution; light precipitate; oxidation. | Dark amber, very slightly hazy solution; very light precipitate; oxidation. |
| 20:1 | 0 | Very black, very opaque solution; medium heavy precipitate. | Very black opaque solution; light precipitate. | Red amber, slightly hazy solution; no precipitate. | Light red amber clear solution; no precipitate. |
| | 72 | Very black, very opaque solution; heavy precipitate; oxidation. | Very black, very opaque solution; medium heavy precipitate; oxidation. | Black amber, slightly opaque solution; light precipitate; oxidation. | Light black amber clear solution; very light precipitate; oxidation. |

EXAMPLE VI.—FERRIC AMMONIUM CITRATE-OXYTETRACYCLINE HYDROCHLORIDE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Dark brown opaque solution; heavy precipitate; incompatible. | Brown yellow opaque solution; heavy precipitate; incompatible. | Red yellow, slightly opaque solution; heavy precipitate; incompatible. | Brown very opaque solution; heavy precipitate; incompatible. |
| | 72 | Brown black, very opaque solution; very heavy precipitate; oxidation. | Light brown black opaque solution; very heavy precipitate; oxidation. | Red yellow opaque solution; heavy precipitate; no oxidation. | Brown very opaque solution; heavy precipitate; no oxidation. |
| 5:1 | 0 | Brown yellow opaque solution; suspended solids. | Light brown yellow, slightly hazy solution; slight precipitate. | Yellow amber clear solution; no precipitate. | Dark yellow clear solution; no precipitate. |
| | 72 | Brown black, very opaque solution; heavy precipitate; oxidation. | Brown black opaque solution; medium heavy precipitate; oxidation. | Light brown black opaque solution; light precipitate; oxidation. | Light brown black opaque solution; light precipitate; oxidation. |
| 20:1 | 0 | Brown amber opaque solution; suspended solids. | Brown yellow, slightly hazy solution; slight precipitate. | Dark yellow clear solution; no precipitate. | Medium yellow clear solution; no precipitate. |
| | 72 | Dark brown black opaque solution; heavy precipitate; oxidation. | Brown black, slightly opaque solution; slight precipitate; oxidation. | Green black clear solution; no precipitate; oxidation. | Light green black clear solution; no precipitate; oxidation. |

EXAMPLE VII.—FERRIC PYROPHOSPHATE-NEOMYCIN SULFATE MIXTURES AND SOLUTIONS THEREOF

| Weight ratio of iron salt to antibiotic in the mixture | Hours after preparation of solution | Appearance of solutions containing the indicated weight ratio of the mixture thereof | | | |
|---|---|---|---|---|---|
| | | Weight ratio of mixture to water | | | |
| | | 1:80 | 1:400 | 1:1,000 | 1:2,000 |
| 1:5 | 0 | Pale green solution; milky suspended floc; incompatible. | Very pale green solution; milky suspended floc; incompatible. | Pale yellow white solution; milky suspended floc; incompatible. | Milky white solution; milky suspended floc; incompatible. |
| | 72 | Pale green solution; heavy white precipitate. | Very pale green solution; heavy white precipitate. | Pale yellow white solution; heavy white precipitate. | Milky white solution; heavy white precipitate. |
| 5:1 | 0 | Medium green solution; milky suspended floc; incompatible. | Light green solution; milky suspended floc; incompatible. | Pale green yellow solution; milky suspended floc; incompatible. | Very pale green yellow solution; milky suspended floc; incompatible. |
| | 72 | Medium green solution; heavy white precipitate. | Light green solution; heavy white precipitate. | Pale green yellow solution; heavy white precipitate. | Very pale green yellow solution; heavy white precipitate. |
| 20:1 | 0 | Green yellow solution; very milky suspended floc; incompatible. | Light green yellow solution; very milky suspended floc; incompatible. | Pale yellow solution; milky suspended floc; incompatible. | Very pale yellow solution; milky suspended floc; incompatible. |
| | 72 | Green yellow solution; heavy white precipitate. | Light green yellow solution; heavy white precipitate. | Pale yellow solution; heavy white precipitate. | Very pale yellow solution; heavy white precipitate. |

EXAMPLE VIII.—FERRIC AMMONIUM CITRATE-NEOMYCIN SULFATE MIXTURES AND SOLUTIONS THEREOF

| Weight ratio of iron salt to antibiotic in the mixture | Hours after preparation of solution | Appearance of solutions containing the indicated weight ratio of the mixture thereof | | | |
|---|---|---|---|---|---|
| | | Weight ratio of mixture to water | | | |
| | | 1:80 | 1:400 | 1:1,000 | 1:2,000 |
| 1:5 | 0 | Amber clear solution; no precipitate. | Yellow amber clear solution; no precipitate. | Pale yellow, slightly opaque solution; no precipitate. | Very light amber, slightly opaque solution; no precipitate. |
| | 72 | do | do | do | Very light amber, slightly opaque solution; trace of sediment. |
| 5:1 | 0 | Green amber; slightly opaque solution; no precipitate. | Dark yellow clear solution; no precipitate. | Medium yellow clear solution; no precipitate. | Light yellow clear solution; no precipitate. |
| | 72 | Green amber slightly opaque solution; trace of sediment. | Dark yellow, slightly opaque solution; trace of sediment. | Medium yellow, slightly opaque solution; no precipitate. | Light yellow, slightly opaque solution; no precipitate. |
| 20:1 | 0 | Dark yellow, green solution; no precipitate. | Dark yellow clear solution; no precipitate. | Medium yellow clear solution; no precipitate. | Light yellow clear solution; no precipitate. |
| | 72 | Green amber clear solution; trace of sediment. | do | do | Light yellow, slightly opaque solution; no precipitate. |

EXAMPLE IX.—FERRIC PYROPHOSPHATE-STREPTOMYCIN SULFATE MIXTURES AND SOLUTIONS THEREOF

| Weight ratio of iron salt to antibiotic in the mixture | Hours after preparation of solution | Appearance of solutions containing the indicated weight ratio of the mixture thereof | | | |
|---|---|---|---|---|---|
| | | Weight ratio of mixture to water | | | |
| | | 1:80 | 1:400 | 1:1,000 | 1:2,000 |
| 1:5 | 0 | Yellow amber clear solution; no precipitate. | Medium yellow clear solution; no precipitate. | Medium yellow clear solution; no precipitate. | Light yellow clear solution; no precipitate. |
| | 72 | Yellow amber, slightly opaque solution; light precipitate. | Medium yellow, slightly opaque solution; light precipitate. | Medium yellow, slightly opaque solution; very light precipitate. | Light yellow, slightly opaque solution; slight precipitate. |
| 5:1 | 0 | Green yellow clear solution; no precipitate. | Light green yellow clear solution; no precipitate. | Light yellow clear solution; no precipitate. | Pale yellow clear solution; no precipitate. |
| | 72 | Green yellow, slightly opaque solution; light precipitate. | Light green yellow clear solution; light precipitate. | Light yellow clear solution; light precipitate. | Light yellow clear solution; medium heavy precipitate. |
| 20:1 | 0 | Green yellow clear solution; no precipitate. | Light green yellow clear solution; no precipitate. | Pale yellow, slightly hazy solution; no precipitate. | Pale yellow, slightly hazy solution; no precipitate. |
| | 72 | Green yellow, slightly opaque solution; light precipitate. | Light green yellow opaque solution; light precipitate. | Pale yellow opaque solution; slight precipitate. | Light yellow opaque solution; slight precipitate. |

EXAMPLE X.—FERRIC AMMONIUM CITRATE-STREPTOMYCIN SULFATE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Dark yellow clear solution; no precipitate. | Medium yellow clear solution; no precipitate. | Light yellow clear solution; no precipitate. | Pale yellow clear solution; no precipitate. |
| | 72 | Dark yellow clear solution; no precipitate. | Dark yellow clear solution; no precipitate. | Medium yellow clear solution; no precipitate. | Do. |
| 5:1 | 0 | Dark yellow clear solution; no precipitate. | do | do | Light yellow clear solution; no precipitate. |
| | 72 | Green amber clear solution; no precipitate. | Amber clear solution; no precipitate. | Medium amber clear solution; no precipitate. | Light amber clear solution; no precipitate. |
| 20:1 | 0 | Dark yellow clear solution; no precipitate. | Dark yellow clear solution; no precipitate. | Medium yellow clear solution, no precipitate. | Pale yellow clear solution; no precipitate. |
| | 72 | Green amber clear solution; trace of sediment. | Medium amber clear solution; no precipitate. | do | Do. |

EXAMPLE XI.—FERRIC PYROPHOSPHATE-BACITRACIN METHYLENE DISALICYLATE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Pale amber opaque solution; suspended solids. | Milky amber opaque solution; suspended solids. | Light milky amber opaque solution; suspended solids. | Pale milky white, slightly opaque solution; slight suspended solids. |
| | 72 | Black amber opaque solution; medium heavy precipitate; oxidation. | Black amber opaque solution; medium heavy precipitate; oxidation. | Gray black opaque solution; light precipitate; oxidation. | Pale gray, slightly opaque solution; very light precipitate; some oxidation. |
| 5:1 | 0 | Milky white opaque solution; suspended solids. | Milky white opaque solution; suspended solids. | Pale milky white, slightly opaque solution; suspended solids. | Very pale white, slightly hazy solution; trace of suspended solids. |
| | 72 | Dark black amber opaque solution; medium heavy precipitate; oxidation. | Black amber opaque solution; medium heavy precipitate; oxidation. | Gray black opaque solution; light precipitate; oxidation. | Pale gray, slightly opaque solution; light precipitate; some oxidation. |
| 20:1 | 0 | Pale yellow opaque solution; suspended solids. | Very pale yellow, slightly opaque solution; suspended solids. | Pale milky white, slightly opaque solution; suspended solids. | Water white, slightly hazy solution; slight suspended solids. |
| | 72 | Black amber opaque solution; medium heavy precipitate; oxidation. | Gray black opaque solution; light precipitate; oxidation. | Pale gray black, slightly opaque solution; light precipitate; oxidation. | Water white, slightly hazy solution; slight precipitate; some oxidation. |

EXAMPLE XII.—FERRIC AMMONIUM CITRATE-BACITRACIN METHYLENE DISALICYLATE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Dark red purple clear solution; no precipitate. | Red purple clear solution; no precipitate. | Red amber, slightly opaque solution; no precipitate. | Pale red amber, slightly opaque solution; no precipitate. |
| | 72 | Dark black purple, slightly opaque solution; slight precipitate; oxidation. | Dark red purple, slightly opaque solution; slight precipitate; oxidation. | Dark red amber opaque solution; very slight precipitate; oxidation. | Red amber, slightly opaque solution; slight precipitate; some oxidation. |
| 5:1 | 0 | Light green black opaque solution; medium heavy precipitate. | Light green black, slightly opaque solution; slight precipitate. | Pale green black clear solution; no precipitate. | Very pale green black clear solution; no precipitate. |
| | 72 | Dark green black, very opaque solution; heavy precipitate; oxidation. | Green black opaque solution; medium heavy precipitate; oxidation. | Light black amber, slightly opaque solution; slight precipitate; oxidation. | Light black amber solution; no precipitate; some oxidation. |
| 20:1 | 0 | Green black opaque solution; medium heavy precipitate. | Light green black opaque solution; slight precipitate. | Light green black, slightly opaque solution; no precipitate. | Pale green black, slightly hazy solution; no precipitate. |
| | 72 | Green black, very opaque solution; medium heavy precipitate; oxidation. | Green black opaque solution; medium heavy precipitate; oxidation. | Gray black, slightly opaque solution; light precipitate; oxidation. | Pale gray black, slightly opaque solution; trace of precipitate; some oxidation. |

EXAMPLE XIII.—FERRIC AMMONIUM CITRATE-POTASSIUM PENICILLIN MIXTURES AND SOLUTIONS THEREOF

| Weight Ratio of iron salt to antibiotic in the mixture | Hours after preparation of solution | Appearance of solutions containing the indicated weight ratio of the mixture to water | | |
|---|---|---|---|---|
| | | Weight ratio of mixture to water | | |
| | | 1:80 | 1:1000 | 1:2000 |
| 1:5 | 0 | Medium yellow clear solution; no precipitate. | Very pale yellow clear solution; no precipitate. | Water white clear solution; no precipitate. |
| | 72 | _____do_____ | _____do_____ | Do. |
| 5:1 | 0 | Dark yellow clear solution; no precipitate. | Light yellow clear solution; no precipitate. | Pale yellow clear solution; no precipitate. |
| | 72 | _____do_____ | _____do_____ | Do. |

EXAMPLE XIV.—IRON SALT-NEOMYCIN SULFATE MIXTURES AND SOLUTIONS THEREOF

| Iron Salt | Weight ratio of iron salt to antibiotic in the mixture | Hours after preparation of solution | Appearance of solutions containing 1:400 weight ratios of iron salt-antibiotic mixtures to water |
|---|---|---|---|
| Soluble iron phosphate | 5:1 | 0 | Yellow green, very opaque solution; suspended solids; incompatible; undissolved iron salt. |
| | | 72 | Do. |
| Ferrous lactate | 5:1 | 0 | Black brown, very opaque solution; suspended solids; incompatible, undissolved iron salt. |
| | | 72 | Do. |
| Iron ammonium sulfate | 5:1 | 0 | Pale amber milky solution; suspended solids; incompatible; iron salt not dissolved. |
| | | 72 | Do. |
| Iron Tartrate | 5:1 | 0 | Dark yellow, very opaque solution; suspended solids; incompatible; undissolved iron salt. |
| | | 72 | Do. |

EXAMPLE XV.—FERRIC PYROPHOSPHATE-POTASSIUM PENICILLIN MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Pale yellow green clear solution; no precipitate. | Very pale yellow clear solution; no precipitate. | Extremely pale yellow clear solution; no precipitate. | Water white clear solution; no precipitate. |
| | 72 | _____do_____ | Very pale yellow, slightly hazy solution; no precipitate. | Extremely pale yellow hazy solution; no precipitate. | Water white, slightly hazy solution; no precipitate. |
| 5:1 | 0 | Green yellow clear solution; no precipitate. | Pale green yellow clear solution; no precipitate. | Very pale green yellow clear solution; no precipitate. | Extremely pale green yellow clear solution; no precipitate. |
| | 72 | _____do_____ | Medium green yellow clear solution; no precipitate. | Pale green yellow clear solution; no precipitate. | Very pale green yellow clear solution; no precipitate. |
| 20:1 | 0 | _____do_____ | Pale green yellow clear solution; no precipitate. | Very pale green yellow clear solution; no precipitate. | Extremely pale green yellow clear solution; no precipitate. |
| | 72 | _____do_____ | Medium green yellow clear solution; no precipitate. | Pale green yellow clear solution; no precipitate. | Very pale green yellow, slightly hazy solution; no precipitate. |

EXAMPLE XVI.—FERRIC AMMONIUM CITRATE-ANTIBIOTIC* MIXTURES AND SOLUTIONS THEREOF

| Weight ratio of iron salt to total antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Amber, slightly hazy solution; no precipitate. | Yellow green, slightly hazy solution; no precipitate. | Pale yellow, slightly hazy solution; no precipitate. | Very pale yellow, slightly hazy solution; no precipitate. |
| | 72 | Amber clear solution; trace of sediment. | _____do_____ | _____do_____ | Do. |
| 5:1 | 0 | Dark green yellow clear solution; no precipitate. | Yellow green clear solution; no precipitate. | Pale yellow green clear solution; no precipitate. | Very pale yellow green clear solution; no precipitate. |
| | 72 | _____do_____ | _____do_____ | _____do_____ | Do. |
| 20:1 | 0 | _____do_____ | _____do_____ | _____do_____ | Do. |
| | 72 | _____do_____ | _____do_____ | _____do_____ | Light amber hazy solution; no precipitate. |

*Equal parts of Neomycin Sulfate and Streptomycin Sulfate were used as the antibiotic.

EXAMPLE XVII.—FERRIC PYROPHOSPHATE-TYLOSIN TARTRATE MIXTURES AND SOLUTIONS THEREOF

| Weight ratio of iron salt to total antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Light green yellow clear solution; no precipitate. | Pale green yellow clear solution; no precipitate. | Very pale green yellow clear solution; no precipitate. | Extremely pale green yellow or clear solution; no precipitate. |
| | 72 | ___do___ | ___do___ | Very pale green yellow, slightly hazy solution; no precipitate. | Extremely pale green yellow hazy solution; no precipitate. |
| 5:1 | 0 | Pale green yellow clear solution; no precipitate. | Very pale green yellow clear solution; no precipitate. | Extremely pale green yellow clear solution; no precipitate. | Virtually water white clear solution; no precipitate. |
| | 72 | ___do___ | Very pale green yellow, slightly hazy solution; no precipitate. | Extremely pale green yellow, slightly hazy solution; no precipitate. | Virtually water white hazy solution; no precipitate. |
| 20:1 | 0 | ___do___ | Very pale green yellow clear solution; no precipitate. | Extremely pale green yellow clear solution; no precipitate. | Virtually water white clear solution; no precipitate. |
| | 72 | ___do___ | Very pale green yellow, slightly hazy solution; no precipitate. | Extremely pale green yellow, slightly hazy solution; no precipitate. | Virtually water white hazy solution; no precipitate. |

EXAMPLE XVIII.—FERRIC AMMONIUM CITRATE-TYLOSIN TARTRATE MIXTURES AND SOLUTIONS THEREOF

| Weight ratio of iron salt to antibiotic in the mixture | Hours after preparation of solution | Appearance of solutions containing the indicated weight ratio of the mixture to water | | | |
|---|---|---|---|---|---|
| | | Weight ratio of mixture to water | | | |
| | | 1:80 | 1:400 | 1:1,000 | 1:2,000 |
| 1:5 | 0 | Medium green yellow clear solution; no precipitate. | Light green yellow clear solution; no precipitate. | Pale green yellow clear solution; no precipitate. | Very pale green yellow clear solution; no precipitate. |
| | 72 | ___do___ | Light green yellow, slightly hazy solution; no precipitate. | ___do___ | Pale orange clear solution; no precipitate. |
| 5:1 | 0 | Very dark green yellow clear solution; no precipitate. | Dark green yellow clear solution; no precipitate. | Medium green yellow clear solution; no precipitate. | Light green yellow clear solution; no precipitate. |
| | 72 | ___do___ | Dark green yellow, slightly hazy solution; no precipitate. | Medium green yellow, slightly hazy solution; no precipitate. | Light green yellow hazy solution; no precipitate. |
| 20:1 | 0 | ___do___ | Dark green yellow clear solution; no precipitate. | Medium green yellow clear solution; no precipitate. | Light green yellow clear solution; no precipitate. |
| | 72 | Very dark green yellow hazy solution; no precipitate. | Dark green yellow hazy solution; no precipitate. | Medium green yellow hazy solution; slight trace of sediment. | Light green yellow hazy solution; no precipitate. |

Examples A through H illustrate use of the iron salt-antibiotic compositions of the present invention in formulations containing diluents, and vitamins. Diluents such as dextrose or the like are used in these formulations for purposes of convenience of handling, that is, formulations can be measured by volume rather than by weight so there is less likelihood of error, waste or loss. The diluents in the formulations act merely as diluents and do not function as stabilizing agents, solubilizing agents or the like.

In Examples E, F, G and H, the fat soluble vitamins, i.e., vitamins A, $D_3$ and E are present in a soluble starch matrix which is dextrin.

EXAMPLE A

Finished product (gms./lb.)

| | |
|---|---|
| Ferric amonium citrate | 60 |
| Neomycin sulfate | 12 |
| Dextrose diluent (q.s.) | 382 |
| | 454 |

EXAMPLE B

Finished product (gms./lb.)

| | |
|---|---|
| Ferric ammonium citrate | 60 |
| Streptomycin sulfate | 12 |
| Dextrose diluent (q.s.) | 382 |
| | 454 |

EXAMPLE C

Finished product (gms./lb.)

| | |
|---|---|
| Ferric ammonium citrate | 60 |
| Potassium penicillin | 15 |
| Dextrose diluent (q.s.) | 379 |
| | 454 |

EXAMPLE D

Finished product (gms./lb.)

| | |
|---|---|
| Ferric ammonium citrate | 60 |
| Streptomycin sulfate | 12 |
| Potassium penicillin | 3 |
| Dextrose diluent (q.s.) | 379 |
| | 454 |

EXAMPLE E

Finished product (gms./lb.)

| | |
|---|---|
| Ferric ammonium citrate | 29.60 |
| Neomycin sulfate | 7.00 |
| Vitamin A (325,000 IU/gm.) | 2.22 |
| Vitamin $D_3$ (200,000 ICU/gm.) | 1.20 |
| Niacin (98% tech. grade) | 6.43 |
| dl-Calcium pantothenate | 10.63 |
| Vitamin $B_{12}$ (60 mg./lb. on sugar) | 24.95 |
| Vitamin E (100,000 IU/lb.) | 1.52 |
| Riboflavin (U.S.P.) | 0.69 |
| Menadione sodium bisulfite (63%) | 0.87 |
| Thiamine mononitrate (U.S.P.) | 0.22 |
| Copper sulfate | 1.90 |
| Preservative | 0.38 |
| Dextrose diluent (q.s.) | 366.39 |
| | 454.00 |

EXAMPLE F

Finished product (gms./lb.)

| | |
|---|---|
| Ferric ammonium citrate | 30.00 |
| Streptomycin sulfate | 6.00 |
| Vitamin A (325,000 IU/gm.) | 1.85 |
| Vitamin $D_3$ (200,000 ICU/gm.) | 1.50 |
| Vitamin E (100,000 IU/lb.) | 1.36 |
| Menadione sodium bisulfite (63%) | 0.79 |
| Dextrose diluent (q.s.) | 412.50 |
| | 454.00 |

EXAMPLE G

| | Finished product (gms./lb.) |
|---|---|
| Ferric ammonium citrate | 30.00 |
| Streptomycin sulfate | 6.00 |
| Potassium penicillin | 1.50 |
| Niacin (98% tech. grade) | 6.12 |
| dl-Calcium pantothenate | 9.66 |
| Vitamin $B_{12}$ (60 mg./lb. on sugar) | 22.73 |
| Riboflavin (U.S.P.) | 0.60 |
| Thiamine hydrochloride (U.S.P.) | 0.20 |
| Pyridoxine hydrochloride (U.S.P.) | 0.20 |
| Dextrose diluent (q.s.) | 376.99 |
| | 454.00 |

EXAMPLE H

| | Finished product (gms./lb.) |
|---|---|
| Ferric ammonium citrate | 60.00 |
| Neomycin sulfate | 7.00 |
| Streptomycin sulfate | 7.00 |
| Vitamin A (325,000 IU/gm.) | 3.85 |
| Vitamin $D_3$ (200,000 ICU/gm.) | 1.56 |
| Vitamin E (100,000 IU/lb.) | 2.27 |
| Menadione sodium bisulfite (63%) | 1.59 |
| Niacin (98% tech. grade) | 12.76 |
| dl-Calcium pantothenate | 19.32 |
| Vitamin $B_{12}$ (60 mg./lb. on sugar) | 37.88 |
| Riboflavin (U.S.P.) | 1.25 |
| Thiamine hydrochloride (U.S.P.) | .40 |
| Pyridoxine hydrochloride (U.S.P.) | .40 |
| Dextrose diluent (q.s.) | 298.72 |
| | 454.00 |

DIRECTIONS FOR THE USE OF THE COMPOSITIONS OF EXAMPLES A THROUGH H

| (I) Examples A, B, C, D and H | | |
|---|---|---|
| | Baby Pigs 0–14 Days Old | Baby Pigs 14–28 Days Old |
| | Dissolve 1 oz. of finished product in ½ gallon of clean, fresh water. Supply ad libitum. Replace solution after 72 hours. | Dissolve 1 oz. of finished product in 1 gallon of clean, fresh water. Supply ad libitum. Replace solution after 72 hours. |
| Approximate dilution factor based on iron-antibiotic content | 1:400 | 1:800 |

| (II) Examples E, F and G | | |
|---|---|---|
| | Baby Pigs 0–14 Days Old | Baby Pigs 14–28 Days Old |
| | Dissolve 2 oz. of finished product in ½ gallon of clean, fresh water. Supply ad libitum. Replace solution after 72 hours. | Dissolve 2 oz. of product in 1 gallon of clean, fresh water. Supply ad libitum. Replace solution after 72 hours. |
| Approximate dilution factor based on iron-antibiotic content | 1:400 | 1:800 |

EXAMPLE XIX

This example describes an animal feeding study demonstrating the use of a drinking water containing an iron salt-antibiotic composition of the present invention and a drinking water containing a comparable composition but omitting the iron salt and the antibiotic.

(A) Preparation of the compositions

The composition described in Example E above was prepared by mixing the required ingredients at room temperature and was designated as Formula E. A comparable composition, which contained all of the ingredients employed in Formula E except that the iron salt (ferric ammonium citrate) and the antibiotic (neomycin sulfate) were omitted, was prepared and designated as Formula E–1. The formulas were in the form of finely divided solids.

(B) Preparation of the ad libitum drinking waters

Formulas E and E–1 were used to prepare drinking waters for ad libitum consumption by newborn, unweaned baby pigs during the feeding study described below. Drinking waters containing 2 oz. of Formula E per 0.5 gal. of water was prepared and supplied to the treated group of baby pigs for their first 14 days after birth, and drinking water containing 2 oz. of Formula E per 1.0 gal. was prepared and supplied to the treated pigs from the 15th through the 21st day after birth. Drinking waters containing the same concentration of Formula E–1 were prepared and supplied to the control group of baby pigs during the same time periods. The drinking waters were supplied from 1 gal. opaque plastic creep waterers so that the baby pigs could consume the water ad libitum. The drinking waters were prepared daily during the feeding study and the quantity of drinking water consumed daily was recorded.

(C) Feeding study

Both the treated and the control groups of baby pigs received the same type of food during the study. The only difference was that the treated group was supplied drinking water containing ferric ammonium citrate and neomycin sulfate and the control group was supplied with drinking water which did not contain ferric ammonium citrate and neomycin sulfate. Both groups of baby pigs were housed in pens with concrete floors and had access to the sow for nursing purposes only. Neither group received any creep rations during the study and did not have access to the sow's feed or water. In other words, both groups of baby pigs were dependent on the sow's milk for their food, and the difference was in the type of drinking water which was supplied. Both groups of baby pigs were kept separate during the feeding study.

38 Duroc and crossbred Duroc baby pigs, which were the treated group of pigs, were allowed to consume their mother's milk and the drinking waters prepared from the composition designated as Formula E under the test conditions described above. 29 baby pigs of the same breeds, which were the control group of pigs, were allowed to consume their mother's milk and drinking waters prepared from the composition designated as Formula E–1 above under the conditions described above.

The following tests were made during the study. The hemoglobin and hematocrit of each pig were determined at 1 day, 10 days and 21 days after birth.

The hemoglobin was determined as hemoglobin g. percent (gram percent) by the procedure described in Am. J. Clinical Pathology, June, 1953 and in Methods and Calibrations for the Spectronic 20 Bausch and Lomb Colorimeter (Rochester, New York).

The hematocrit was determined as hematocrit percent (percent of total blood) by the procedure on pages 148–195 of Veterinary Clinical Pathology—3 ed. (Comstock Publishing Co., Inc., Ithaca, New York 1955).

(D) Results of the feeding tests

Results of the feeding study are shown in the table entited Example XIX, Summary of Feeding Study. This table shows the number of pigs supplied with drinking waters prepared from Formulas E and E–1, the hemoglobin, the standard deviations from the hemoglobin, the hematocrit, the standard deviations from the hematocrit; the cumulative mortality for both the treated and the controlled groups of pigs at 1 day, 10 days and 21 days after birth; the cumulative amount of drinking water (total cc.) consumed per pig and the cumulative amount of formula (g) consumed per pig.

The data in this table demonstrate the following. The control group of pigs, that is, those supplied with drinking water containing Formula E–1, showed a normal decline of hemoglobin in the blood from birth to the termination of the study, 21 days later. On the other hand, the treated group of baby pigs, that is, the group supplied with drinking water containing Formula E, showed a slight increase in hemoglobin which was attributed to the presence of Formula E in the drinking water. Likewise, the control group showed a steady plateau level of hematocrit in the blood throughout the study, whereas the treated group supplied with Formula E showed a distinct rise in the level of hermatocrit as the study progressed.

Further, a statistical analysis of the individual hemoglobin values for the control and treated groups showed that the treated group supplied with the iron salt-antibiotic composition had a highly significant improvement in hemoglobin level at both 10 and 21 days, that is, ($P<0.01$). Similarly, a statistical analysis of the individual hematocrit values for the control and treated groups showed a significant ($P<0.05$) improvement in hematocrit level for the treated group at 10 days and a highly significant ($P<0.01$) improvement in hematocrit level for the treated group at 21 days.

EXAMPLE XIX.—SUMMARY OF FEEDING STUDY

| | Drinking water prepared with— | | | | | |
|---|---|---|---|---|---|---|
| | Formula E | | | Formula E-1 (Without Ferric Ammonium Citrate and Neomycin Sulfate) | | |
| | 1 Day | 10 Days | 21 Days | 1 Day | 10 Days | 21 Days |
| Days after birth | | | | | | |
| Pigs, number | 38 | 34 | 31 | 29 | 23 | 23 |
| Hemoglobin (g. percent, avg.) | 9.3 | 10.1 | 10.8 | 9.4 | 9.1 | 8.6 |
| Std. deviations | ±0.816 | ±0.948 | ±1.36 | ±0.678 | ±0.911 | ±1.35 |
| Hematocrit (percent, avg.) | 26.6 | 28.6 | 31.6 | 27.0 | 27.5 | 26.7 |
| Std. deviations | ±2.45 | ±1.56 | ±3.04 | ±2.76 | ±2.48 | ±3.19 |
| Cumulative mortality | 0 | 4 | 7 | 0 | 6 | 6 |
| Cumulative amount of drinking water consumed per pig (cc.) | 192 | 1,330 | 3,652 | 188 | 2,294 | 6,477 |
| Cumulative amount of formula consumed per pig (g.) | 5.75 | 39.83 | 83.68 | 5.64 | 68.73 | 143.50 |

What is claimed is:

1. A stable, compatible water soluble composition for adding to water for drinking ad libitum by an animal selected from the group consisting of:
    (I) a composition consisting of;
        (A) ferric ammonium citrate, and
        (B) at least one antibiotic selected from the group consisting of neomycin sulfate, streptomycin sulfate, potassium penicillin and tylosin tartrate, and
    (II) a composition consisting of;
        (A) ferric pyrophosphate, and
        (B) at least one antibiotic selected from the group consisting of potassium penicillin and tylosin tartrate
the weight ratios of said citrate or said pyrophosphate to said antibiotic being from about 1:5 to about 20:1.

2. The composition of claim 1 in which said antibiotic is neomycin sulfate.

3. The composition of claim 1 in which there is present at least one additive selected from the group consisting of a water soluble vitamin, a fat soluble vitamin in a soluble matrix, a water soluble trace mineral and a water soluble diluent.

4. A stable, compatible aqueous composition useful as an ad libitum drinking water for an animal selected from the group consisting of:
    (I) a composition consisting of;
        (A) ferric ammonium citrate,
        (B) at least one antibiotic selected from the group consisting of neomycin sulfate, streptomycin sulfate, potassium penicillin and tylosin tartrate, and
        (C) water, and
    (II) a composition consisting of;
        (A) ferric pyrophosphate,
        (B) at least one antibiotic selected from the group consisting of potassium penicillin and tylosin tartrate, and
        (C) water
the weight ratio of said citrate or said pyrophosphate to said antibiotic being from about 1:5 to about 20:1, and the weight ratio of said citrate or said pyrophosphate plus said antibiotic to water being from about 1:80 to about 1:2000.

5. The composition of claim 4 in which said antibiotic is neomycin sulfate.

6. The composition of claim 4 in which there is present at least one additive selected from the group consisting of a water soluble vitamin, a fat soluble vitamin in a soluble matrix, a water soluble trace mineral and a water soluble diluent.

7. A process for controlling nutritional deficiencies in an animal which comprises supplying to said animal, ad libitum, the stable, compatible aqueous composition of claim 4.

8. The process of claim 7 in which said antibiotic is neomycin sulfate.

9. The process of claim 7 in which there is present at least one additive selected from the group consisting of a water soluble vitamin, a fat soluble vitamin in a soluble matrix, a water soluble trace mineral and a water soluble diluent.

10. The process of claim 7 in which the animals are pigs.

11. The process of claim 7 wherein said water soluble diluent is sucrose.

12. The process of claim 7 wherein said water soluble diluent is dextrose.

13. The composition of claim 6 wherein said water soluble diluent is sucrose.

14. The composition of claim 6 wherein said water soluble diluent is dextrose.

References Cited

UNITED STATES PATENTS

| | | | |
|---|---|---|---|
| 2,906,621 | 9/1959 | Catron | 424—94 |
| 3,160,565 | 12/1964 | Duell | 424—147 |
| 3,234,086 | 2/1966 | Hartmann et al. | 99—2 |
| 3,244,527 | 4/1966 | Baker | 99—2 |
| 3,250,623 | 5/1966 | St. Clair | 99—2 |
| 3,259,500 | 7/1966 | Barnhart et al. | 99—2 |
| 3,276,956 | 10/1966 | Cardinal | 99—2 |
| 3,279,923 | 10/1966 | Baver et al. | 99—2 |
| 3,395,229 | 7/1968 | Feigh et al. | 99—2 |

FRANK CACCIAPAGLIA, JR., Primary Examiner

F. E. WADDELL, Assistant Examiner

U.S. Cl. X.R.

424—120, 128, 140, 144, 147, 236, 237, 266, 271, 284, 295, 319, 361